(12) United States Patent
Lasley et al.

(10) Patent No.: US 10,151,131 B2
(45) Date of Patent: Dec. 11, 2018

(54) COMBINATION CONTACT AND NON-CONTACT SENSING EDGE

(71) Applicant: Miller Edge, Inc., West Grove, PA (US)

(72) Inventors: Daniel G. Lasley, West Chester, PA (US); William Kalin, West Grove, PA (US); Tim Castello, West Chester, PA (US); Kelly Wade Hedegard, Scottsdale, AZ (US)

(73) Assignee: Miller Edge, Inc., West Grove, PA (US)

( * ) Notice: Subject to any disclaimer, the term of this patent is extended or adjusted under 35 U.S.C. 154(b) by 42 days.

(21) Appl. No.: 15/405,715

(22) Filed: Jan. 13, 2017

(65) Prior Publication Data
US 2017/0198513 A1 Jul. 13, 2017

Related U.S. Application Data

(60) Provisional application No. 62/278,113, filed on Jan. 13, 2016.

(51) Int. Cl.
| | |
|---|---|
| *E05F 15/44* | (2015.01) |
| *E05F 15/603* | (2015.01) |
| *G01V 3/08* | (2006.01) |

(52) U.S. Cl.
CPC .............. *E05F 15/44* (2015.01); *G01V 3/088* (2013.01); *E05Y 2400/44* (2013.01); (Continued)

(58) Field of Classification Search
None
See application file for complete search history.

(56) References Cited

U.S. PATENT DOCUMENTS

| 363,290 A | 5/1887 | Freeman |
|---|---|---|
| 3,133,167 A | 5/1964 | Miller |

(Continued)

FOREIGN PATENT DOCUMENTS

CA 1174902 A 9/1984

OTHER PUBLICATIONS

Int'l Search Report dated Mar. 24, 2017 in In'l Application No. PCT/US2017/013429.

*Primary Examiner* — Bentsu Ro
(74) *Attorney, Agent, or Firm* — Panitch Schwarze Belisario & Nadel LLP

(57) ABSTRACT

A system for detecting presence of an external obstacle combining contact and non-contact sensing in a common safety edge of a motorized closure includes a sensing edge with an elongate sheath forming a cavity in which two electrically conductive elements are physically and electrically separated. A control circuit includes an oscillator electrically connected to the conductive elements and that drives each at a drive frequency to establish an electric field. A controller is electrically connected to the first and second conductive elements and determines whether (i) the first and second conductive elements are in electrical contact with one another or (ii) a change to the drive frequency exceeds a threshold value. In response to a finding of either condition (i) or (ii), the controller outputs a signal to initiate or disrupt motion of the motorized closure. Two inductors connected to the conductive elements isolate the oscillator from the controller.

13 Claims, 7 Drawing Sheets

(52) U.S. Cl.
CPC ....... *E05Y 2400/45* (2013.01); *E05Y 2400/52* (2013.01); *E05Y 2900/106* (2013.01)

(56) References Cited

U.S. PATENT DOCUMENTS

| | | | |
|---|---|---|---|
| 3,315,050 A | 4/1967 | Miller | |
| 3,396,252 A | 8/1968 | Serizawa et al. | |
| 3,462,885 A | 8/1969 | Miller | |
| 3,812,313 A | 5/1974 | Wolf et al. | |
| 3,855,733 A | 12/1974 | Miller | |
| RE28,365 E | 3/1975 | Brave | |
| 4,019,004 A | 4/1977 | Gute | |
| 4,090,045 A | 5/1978 | Marsh | |
| 4,362,911 A | 12/1982 | Sears et al. | |
| 4,396,814 A | 8/1983 | Miller | |
| 4,401,896 A | 8/1983 | Fowler et al. | |
| 4,497,989 A | 2/1985 | Miller | |
| 4,661,664 A | 4/1987 | Miller | |
| 4,754,757 A | 7/1988 | Feucht | |
| 4,785,143 A | 11/1988 | Miller | |
| 4,908,483 A | 3/1990 | Miller | |
| 4,920,241 A | 4/1990 | Miller | |
| 4,954,673 A | 9/1990 | Miller | |
| 4,972,054 A | 11/1990 | Miller et al. | |
| 5,023,411 A | 6/1991 | Miller et al. | |
| 5,027,552 A * | 7/1991 | Miller | H01H 3/142 49/27 |
| 5,079,417 A | 1/1992 | Strand | |
| 5,087,799 A | 2/1992 | Pariot et al. | |
| 5,089,672 A | 2/1992 | Miller | |
| 5,192,837 A | 3/1993 | Chardon | |
| 5,225,640 A | 7/1993 | Miller et al. | |
| 5,260,529 A | 11/1993 | Miller | |
| 5,285,136 A | 2/1994 | Duhame | |
| 5,345,671 A | 9/1994 | Miller | |
| 5,418,342 A | 5/1995 | Miller | |
| 5,438,798 A | 8/1995 | Plamper et al. | |
| 5,682,136 A | 10/1997 | Del Signore et al. | |
| 5,728,984 A | 3/1998 | Miller | |
| 5,839,227 A | 11/1998 | Gardner | |
| 5,921,026 A | 7/1999 | Miller | |
| 5,962,825 A | 10/1999 | Miller | |
| 6,158,170 A * | 12/2000 | Brodowsky | B60J 10/00 49/28 |
| 6,571,512 B1 | 6/2003 | Miller et al. | |
| 6,700,393 B2 | 3/2004 | Haag et al. | |
| 8,384,557 B2 | 2/2013 | Gunton | |
| 2012/0214412 A1 | 8/2012 | Schlub et al. | |
| 2012/0274604 A1 | 11/2012 | Norton et al. | |
| 2015/0369941 A1 | 12/2015 | Pribisic et al. | |

\* cited by examiner

COMBINATION CONTACT AND NON-CONTACT SENSING EDGE

CROSS-REFERENCE TO RELATED APPLICATIONS

This application claims the benefit of U.S. Provisional Patent Application No. 62/278,113, filed on Jan. 13, 2016, entitled "Combination Contact and Non-Contact Sensing Edge," the entire contents of which are incorporated by reference herein.

BACKGROUND OF THE INVENTION

An embodiment of the present invention relates generally to sensing edges for motorized closures, and more particularly, to a combination contact and non-contact sensing edge.

Contact sensing edges for automatic closures (e.g., doors, gates, windows, and the like) are generally well known. A description of such sensing edges can be found, for example, U.S. Pat. No. 5,089,672, entitled "Flexible Electrically Conductive Contact for a Switch which is Actuated Upon Force Being Applied Thereto," and U.S. Pat. No. 6,571,512, entitled "Universal Sensing Edge with Non-Melt End Closure," the entire contents of each of which are incorporated by reference herein.

Such sensing edges generally include an elongate sheath in which a force sensing switch (sensor) is positioned. Upon the application of an undesired force to the sheath, the sensor actuates suitable control circuitry for controlling movement of, for example, a door. The sensor, positioned within the sheath, typically comprises a pair of electrically conductive, preferably flexible, elements that are ordinarily physically and electrically separated from one another. The conductive elements may be wires, foils, conductive polymers, or the like. The conductive elements may be physically separated by air, but other materials may be used to ensure the separation, such as a perforated foam or other permeable non-conductive material. Upon application of force to the sheath, the two conductive elements are forced into contact, reducing resistance between the two conductive elements from a very high value to a very small value. The system interprets this condition as the presence of an obstacle, which signals the motor controller to act accordingly.

Proximity or non-contact sensors are also generally known. Such sensors generally include a sensing antenna that is connected to a self-resonating oscillator and which generates an electric field in a region of the sensor. The proximity of conductive objects in the field changes the oscillator's frequency. When the frequency changes by a threshold amount, an object in the field is "sensed," and suitable control circuitry may be actuated to provide an alarm or to undertake measures to avoid contact with the sensed object. An early method of non-contact sensing was described in U.S. Pat. No. 1,661,058, which taught an instrument that could generate audible sound tones in response to changes in proximity of a human hand (acting as a ground plate of a variable capacitor) to an oscillating system.

As with any such device, there is an assumption of an earth-ground connection to the environment. Closures are typically connected to ground through rails and/or posts. In addition, the leading edge of a door commonly has a metal bar. It is necessary for the oscillator circuit in such a system to be connected to this common ground. Any shields must also be connected to the circuit ground or an equivalent earth-ground.

Contact sensing edges have the drawback that contact must necessarily be made with an object in order to activate the safety response of the door. While non-contact sensors can overcome this drawback with respect to conductive objects, such as individuals or metal objects, non-conductive materials (e.g., paper, wood, plastic, or the like) are not accurately detectable by this method. Thus, it is desirable to provide a door or other motorized closure with both contact and non-contact sensing capabilities. Attempts have been made in this regard. However, the contact and non-contact sensors were separate from one another. Such combinations are more complex and expensive to implement.

It is therefore desirable to provide a combination contact and non-contact sensing edge that is simple to implement without changing the design of the sensing edge.

BRIEF SUMMARY OF THE INVENTION

Briefly stated, an embodiment of the present invention is directed to a system for detecting presence of an external obstacle in the path of an edge of a motorized closure. The system includes a sensing edge having an elongate sheath configured to be positioned adjacent to the edge of the motorized closure and being compressible upon application of external pressure by the external obstacle. The elongate sheath forms a cavity. First and second electrically conductive elements are positioned within the cavity of the sheath. The first and second conductive elements are physically and electrically separated from one another and configured to be forced into contact with one another upon pressure being applied to the sheath by the external obstacle. A control circuit includes a self-resonating oscillator electrically connected to each of the first and second conductive elements and configured to drive each of the first and second conductive elements at a drive frequency to establish an electric field proximate to the sensing edge. A controller is electrically connected to the first and second conductive elements and receives an output of the oscillator. The controller is configured to determine whether (i) the first and second conductive elements are in electrical contact with one another or (ii) a change to the drive frequency of the oscillator exceeds a threshold value. The controller is further configured to, in response to a finding of either condition (i) or (ii), output a signal to a motor controller of the motorized closure to initiate or disrupt motion of the motorized closure. A first inductor is electrically connected in series between the controller and a point of connection of the first conductive sheet to the oscillator. A second inductor is electrically connected in series between the controller and a point of connection of the second conductive sheet to the oscillator.

Another embodiment of the present invention is directed to a control circuit for a sensing edge used to detect the presence of an external obstacle in the path of an edge of a motorized closure. The sensing edge includes an elongate sheath positioned adjacent to the edge of the motorized closure and being compressible upon application of external pressure by the external obstacle. First and second electrically conductive elements are positioned within the sheath. The first and second conductive elements are configured to electrically contact one another upon pressure being applied to the sheath by the external obstacle. The control circuit includes a self-resonating oscillator electrically connectable to each of the first and second conductive elements and configured to drive each of the first and second conductive elements at a drive frequency to establish an electric field proximate to the sensing edge. A controller is electrically connectable to the first and second conductive elements and receives an output of the oscillator. The controller is configured to determine whether (i) the first and second conductive elements are in electrical contact with one another or (ii) a change to the drive frequency of the oscillator exceeds a threshold value. The controller is further configured to, in response to a finding of either condition (i) or (ii), output a signal to a motor controller of the motorized closure to initiate or disrupt motion of the motorized closure. A first inductor is electrically connected in series between the controller and a point of connection of the first conductive element to the oscillator and a second inductor is electrically connected in series between the controller and a point of connection of the second conductive element to the oscillator.

BRIEF DESCRIPTION OF THE SEVERAL VIEWS OF THE DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Figure 1:
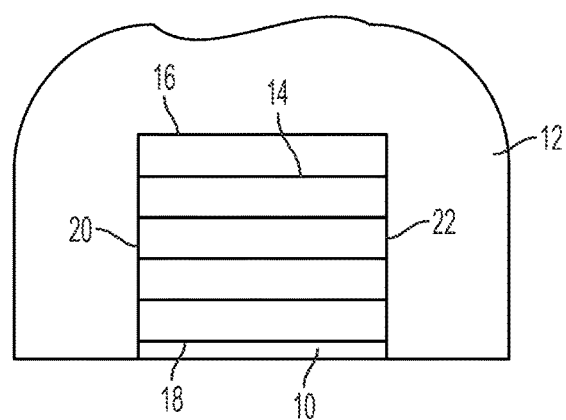
FIG. 1 is a front elevational view showing a door including a sensing edge in accordance with a first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail there is shown in FIG. 1 a building wall 12 having a doorway 16 provided with a door 14. While the door 14 is illustrated as an overhead door having a sensing edge 10 in accordance with a preferred embodiment of the present invention along a lower side or leading edge surface 18, it is within the scope and spirit of the invention to incorporate the sensing edge 10 along the edge of any door structure, such as vertically disposed or horizontally movable doors (not shown), as desired. Moreover, it is understood to those skilled in the art that the sensing edge 10 is not limited to use in connection with only doors, it can be used for other motorized closures, such as windows, gates, or the like. The sensing edge 10 may be used to halt or reverse a closing operation of the motorized closure, and/or in some embodiments can be used to initiate opening of the motorized closure from a closed state. In some embodiments (e.g., gates), this system may be intended to operate in the opening direction.

In addition to the leading edge surface 18, the door 14 has a first lateral side surface 20 and a second lateral side surface 22. The first lateral side surface 20 and second lateral side surface 22 extend generally parallel with respect to each other, and are oppositely disposed. The door 14 is generally movably mounted on a track (not shown), which guides the door 14 through a range of motion. While the door 14 is indicated to be mounted on a track, it is understood by those skilled in the art that other methods of mounting the door 14 in the doorway 16 can be employed, including hinges, levers, and the like, without departing from the spirit and scope of the invention.

A reversible motor (not shown) and associated circuitry are provided to open and close the door 14 or other closure. The sensing edge 10 and other like entrapment protection devices are connected to the motor circuitry.

The sensing edge 10 is preferably secured to the leading edge 18 of the door 14 using conventional techniques, such as by providing the sensing edge 10 and the door 14 with one or more respective complementary shaped members and slots (not shown), which may be secured using friction-fit, adhesive (not shown), mechanical fasteners (not shown), or the like. A peripheral or facing surface of the sensing edge 10 may also be secured to the leading edge 18 via adhesives, mechanical fasteners, or the like.

Figure 2:
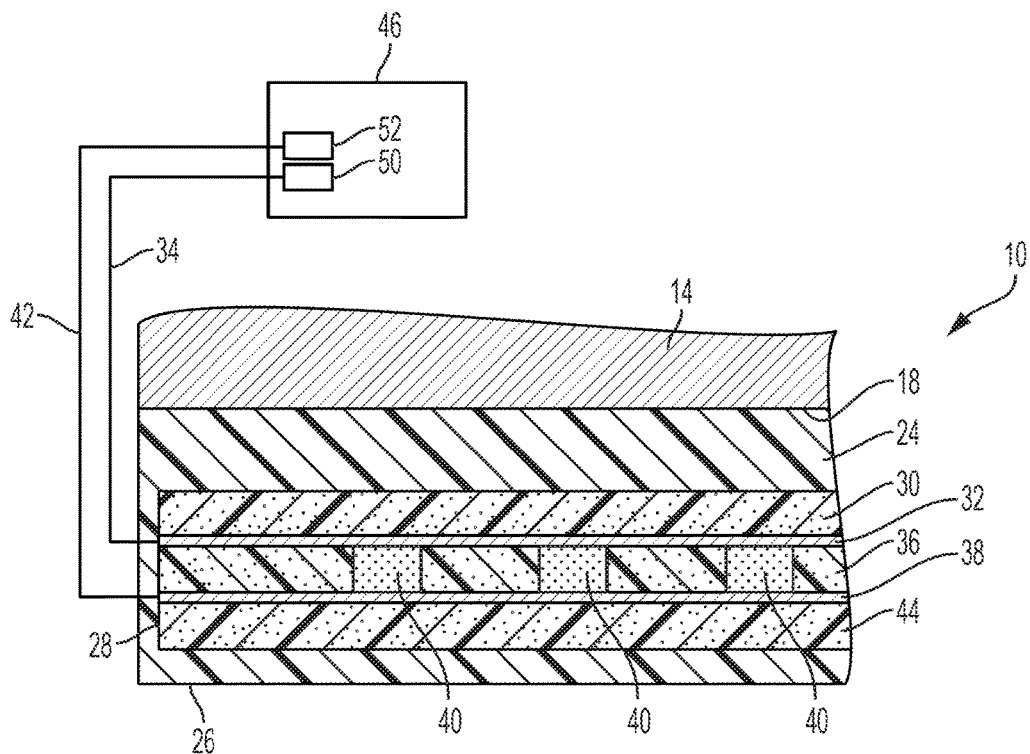
FIG. 2 is a greatly enlarged cross-sectional view of a portion of an exemplary sensing edge that can be used with the door in FIG. 1.

Referring now to FIG. 2, an example of a sensing edge 10 is shown including an elongate sheath 24 that is compressible upon application of external pressure and preferably fabricated of flexible, air impervious material, such as rubber or the like. It is preferred that the sheath 24 have a generally constant cross-sectional configuration, extending along the leading edge surface 18 of the door 14. In the presently preferred embodiment, the sheath 24 is generally of rectangular cross section, but may be of any other suitable cross-sectional configuration, such as circular, semi-circular, or the like (not shown).

The sheath 24 preferably has an exterior surface 26 enclosing a cavity 28. A portion of the exterior surface 26 is configured to contact the ground, a door threshold, or other surface of the doorway 16 (see FIG. 1). A first sheet of resiliently compressible material 30, such as soft foam rubber may be positioned within the cavity 28 of the sheath 24. It is understood by those skilled in the art that the first compressible sheet 30 can be constructed of either closed or open cell foam rubber or of other materials having similar properties. It is further understood that inclusion of the first compressible sheet 30 is optional.

A first electrically conductive element 32, shown in FIG. 2 in the form of a flexible, electrically conductive sheet, is preferably provided adjacent to, and preferably in facing contact with, the first sheet of resiliently compressible material 36. The first electrically conductive element 32 is preferably made from aluminum, although other types of conductive materials may be used as well. A first electrical conductor or wire 34 is electrically connected to the first electrically conductive element 32, preferably by crimping, although other conventional methods of attachment can be used as well. The first electrical conductor 34 is preferably connected to a first contact 50 of a control circuit 46, which is described in further detail hereinafter. While shown as an electrically conductive sheet in FIG. 2, other forms for the first electrically conductive element 32 can be used as well, such as wires, conductive polymers, foils, or the like. Moreover, in embodiments without the first compressible sheet 30, the first electrically conductive element 32 may be self-supporting, be fixed to an inner wall of the cavity 28, or be arranged in the sheath 24 in other like configurations.

At a surface opposite to the first compressible material 30, the first electrically conductive element 32 is preferably also in facing engagement with a layer of nonconductive material 36, which may be provided for spacing apart the first electrically conductive element 32 from a second electrically conductive element 38, shown in FIG. 2 as a second flexible, electrically conductive sheet. The nonconductive layer 36 has at least one opening 40 extending therethrough. As shown in FIG. 2, the nonconductive layer 36 preferably includes a plurality of openings 40 interspersed therealong. The openings 40 are preferably oval-shaped in cross section, although other suitable geometric shapes, such as square, circular, or the like may be used as well. The nonconductive layer 36 is preferably constructed of generally soft foam rubber or the like.

While the nonconductive layer 36 is shown in FIG. 2 as a perforated foam material, other permeable nonconductive materials may be used as well, as long as the material allows for an electrical connection between the two electrically conductive elements 32, 38 when the sheath 24 is compressed. In addition, the nonconductive layer 36 can be omitted in some embodiments, such that the first and second electrically conductive elements 32, 38 may be physically separated from one another by air.

The second electrically conductive element 38 is preferably similar to the first electrically conductive element 32, and is connected to a second electrical conductor or wire 42 for connection with a second contact 52 of the control circuit 46. Although the second electrically conductive element 38 is shown in FIG. 2 as a conductive sheet, other forms, such as wires, conductive polymers, foils, or the like may be used as well.

A second sheet of resiliently compressible material 44 is preferably in facing engagement with a surface of the second electrically conductive element 38 opposite to the nonconductive layer 36. The second compressible sheet 44 is preferably constructed of the same material and configured generally identically to the first compressible sheet 30. However, it is apparent to those skilled in the art that the first and second compressible sheets 30, 44 can differ in configuration, size, and/or material. In addition, much like the first compressible sheet 44, the second compressible sheet 44 is optional.

Figure 3:
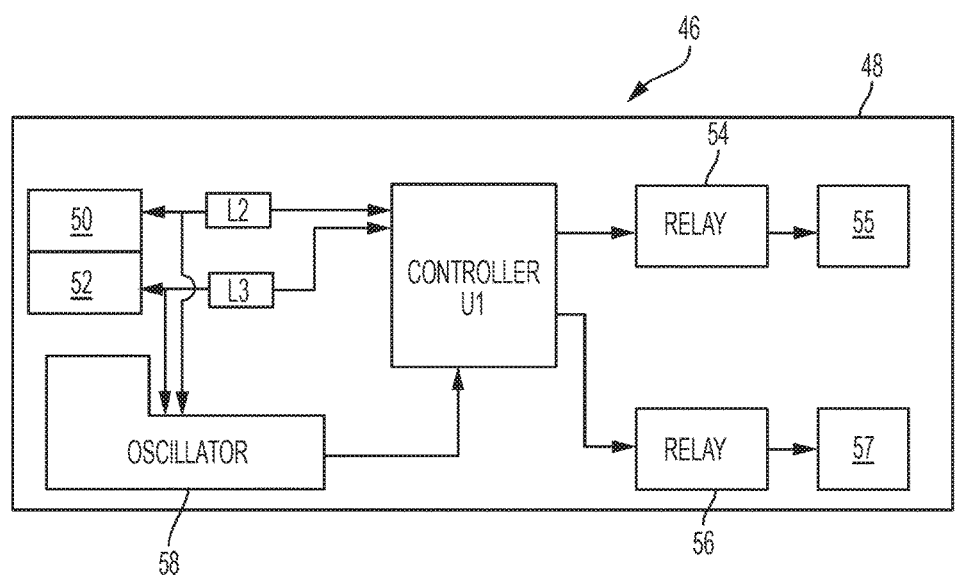
FIG. 3 is a schematic block diagram of a control circuit used with the sensing edge of FIG. 1.

FIG. 3 is a schematic block diagram of a circuit board 48 on which the control circuit 46 may be mourned. While the control circuit 46 is shown as being implemented on a single circuit board 48, the various components of the control circuit 46 may be divided among multiple boards or substrates (not shown) as desired. The control circuit 46 preferably includes the first and second contacts 50, 52 to which the first and second electrically conductive elements 32, 38 (FIG. 2) are electrically connected. The control circuit 46 further preferably includes a controller U1, which is preferably a microprocessor, although other types of controllers, such as an application specific integrated circuit (ASIC), a logic circuit (PLC), combinations thereof, or the like.

The control circuit 46 further preferably includes a relay 54 connected to a first output contact 55 configured to output a signal to a door motor controller (not shown) for halting and/or reversing operation of the door 14 in response to contact of an object with the sensing edge 10. The contact sensor relay 54 can be a conventional mechanical relay, a solid-state relay, a simple transistor, or the like. The control circuit 46 further preferably includes a non-contact sensor relay 56 connected to a second output contact 57 configured to output a signal for initiating, preventing, halting, and/or reversing operation of the door 14 in response to detection of an object in proximity to the sensing edge 10. The non-contact sensor relay 56 is preferably a normally open solid state relay, although other types and configurations may be utilized as well. The control circuit may logically combine the two outputs to provide a single control signal to the door operator. While relays are shown in FIG. 3 as the primary examples for communicating with the door motor controller, other methods and components may be used as well.

The control circuit 46 further preferably includes a self-resonating oscillator 58 and a pair of inductors L2, L3, all of which will be described in more detail below with respect to FIG. 4. In addition, other conventional components, such as power inputs/outputs, indicators, or other like components may be utilized on the circuit board 48 and/or as part of the control circuit 46. A description of such components herein is omitted since such components would be typically known to one skilled in the art.

Figure 4:
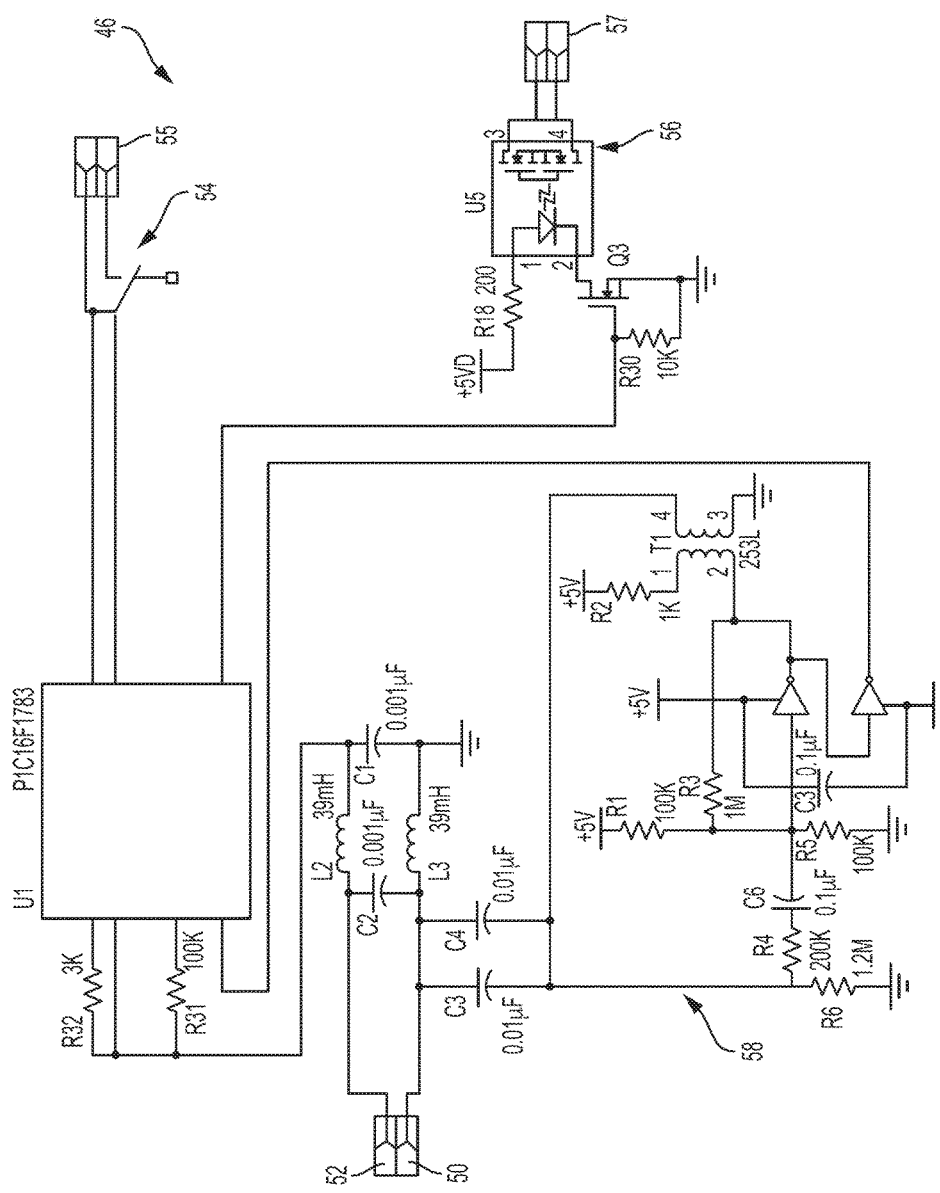
FIG. 4 is a partial circuit level diagram of the control circuit of FIG. 3.

FIG. 4 is a circuit level diagram of certain components of the control circuit 46. The first and second contacts 50, 52 are used for both contact and non-contact sensing. For non-contact sensing, the first and second contacts 50, 52 are respectively connected to the oscillator 58 via capacitors C3, C4. In this manner, the first and second electrically conductive elements 32, 38 serve as a form of antenna for establishing a field near the leading edge 18 of the door 14. Since both electrically conductive elements 32, 38 are driven by the same oscillator 58, they behave as a single antenna. An object, particularly a conductive object in the path or near the path of the door 14 disturbs the field, which results in a change in the oscillation frequency.

The oscillator 58 is, in turn, connected to an input of the controller U1, which compares the latest frequency to a reference value. If a change greater than the threshold is detected, the controller U1 actuates the non-contact sensor relay 56. In this example, the oscillator 58 oscillates at a frequency of 300 kHz, and the threshold for detection of an object is preferably a frequency change on the order of 0.1%. However, other frequencies and thresholds may be set as desired. The threshold may also be adjustable, for example, to account for noise, environmental changes that may impact the oscillation frequency, or the like. It is understood by those skilled in the art that the frequency change detection may be performed by any hardware or software programming within the controller U1 that can measure or detect small changes in frequency. This could include, for example, various frequency modulation (FM) detectors (e.g., a phase-lock-loop or the like), a calculation based on period instead of frequency, or the like.

In the simplest embodiment, the change in frequency between two sequential samples may be sufficient to detect the presence of an obstacle. Various parameters related to sampling times, door velocity, power saving methods, and the like will preferably be used to determine the best method for detecting change in the target environment.

Figure 8:
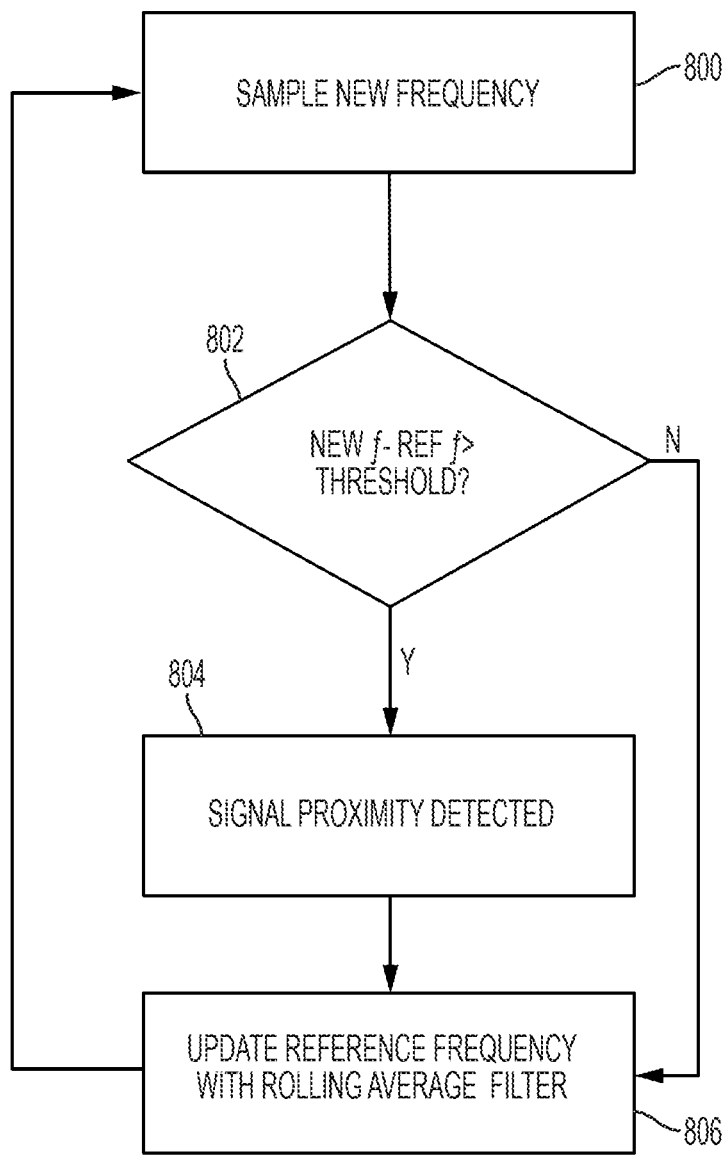
FIG. 8 is flow diagram illustrating a method of non-contact sensing in accordance with a fifth preferred embodiment of the present invention.

In one embodiment, the reference frequency may be adjusted to account for environment changes. For example, temperature and humidity can affect the oscillator frequency, causing changes on the order of 2-10%. In order to detect the much smaller changes caused by an obstacle (e.g., 0.1%), the control circuit 46 may utilize a rolling average filter method. FIG. 8 is an exemplary flow diagram of a method for the non-contact detection employed by the sensing edge 10. At step 800, a "new" frequency (i.e., current frequency) of the oscillator 58 is sampled by the controller U1. At step 802, the controller U1 determines whether a difference between the new frequency and the reference frequency exceeds a threshold. If so, at step 804 the controller U1 signals that an obstacle in proximity has been detected, e.g., via the signal to the non-contact sensor relay 56. Afterward, at step 806 the reference frequency is updated using a slow rolling average filter. Generally, the moving average should be 10 to 100 times or more longer than the expected rate of frequency change caused by an obstacle. For example, if a door closes at a speed of six inches per second and the system has a sensitivity of six inches, then the rolling average should be calculated on a time scale of at least ten seconds, up to one hundred seconds, and possibly much longer. After updating the reference frequency, the loop returns to step 800. If, at step 802 the controller U1 determines that the threshold has not been exceeded, the controller U1 skips to step 806 to update the reference using the slow rolling average filter, and then returns the loop to step 800. Specific parameters of the rolling average filter can be modified to meet the specific application or installation, as necessary.

The first and second contacts 50, 52 are also connected to the inductors L2, L3, which block the signal from the oscillator 58 and allow DC aspects of the contact sensor to reach the controller U1 in a conventional manner. Specifically, the inductor L2 is placed in series between the first contact 50 and the controller U1 and the inductor L3 is similarly placed in series between the second contact 52 and the controller U1. As a result, the first and second electrically conductive elements 32, 38 are driven with a voltage to establish the non-contact electrical field, but the inductors L2, L3 isolate the oscillator 58 from the controller U1 to allow for conventional mechanical contact sensing to occur using the same first and second electrically conductive elements 32, 38. Although inductors L2, L3 are shown as isolating the oscillator 58 from the controller U1, other like components or methods for isolation may be used as well. In operation, if the leading edge 18 of the door 14 contacts an object, the sheath 24 and second compressible material 44 are compressed by the object, which forces the first and second electrically conductive elements 32, 38 into physical and electrical contact (e.g., through one or more of the openings 40 in the nonconductive layer 36). The controller U1 senses, via the first and second contacts 50, 52, completion of a circuit (connecting of the first and second electrically conductive elements 32, 38 acting as a "switch"), and actuates the contact sensor relay 54. While not shown here, those skilled in the art recognize that similar circuitry allows for the detection of terminations used for monitoring (e.g., resistors, capacitors, diodes, and the like).

Figure 5:
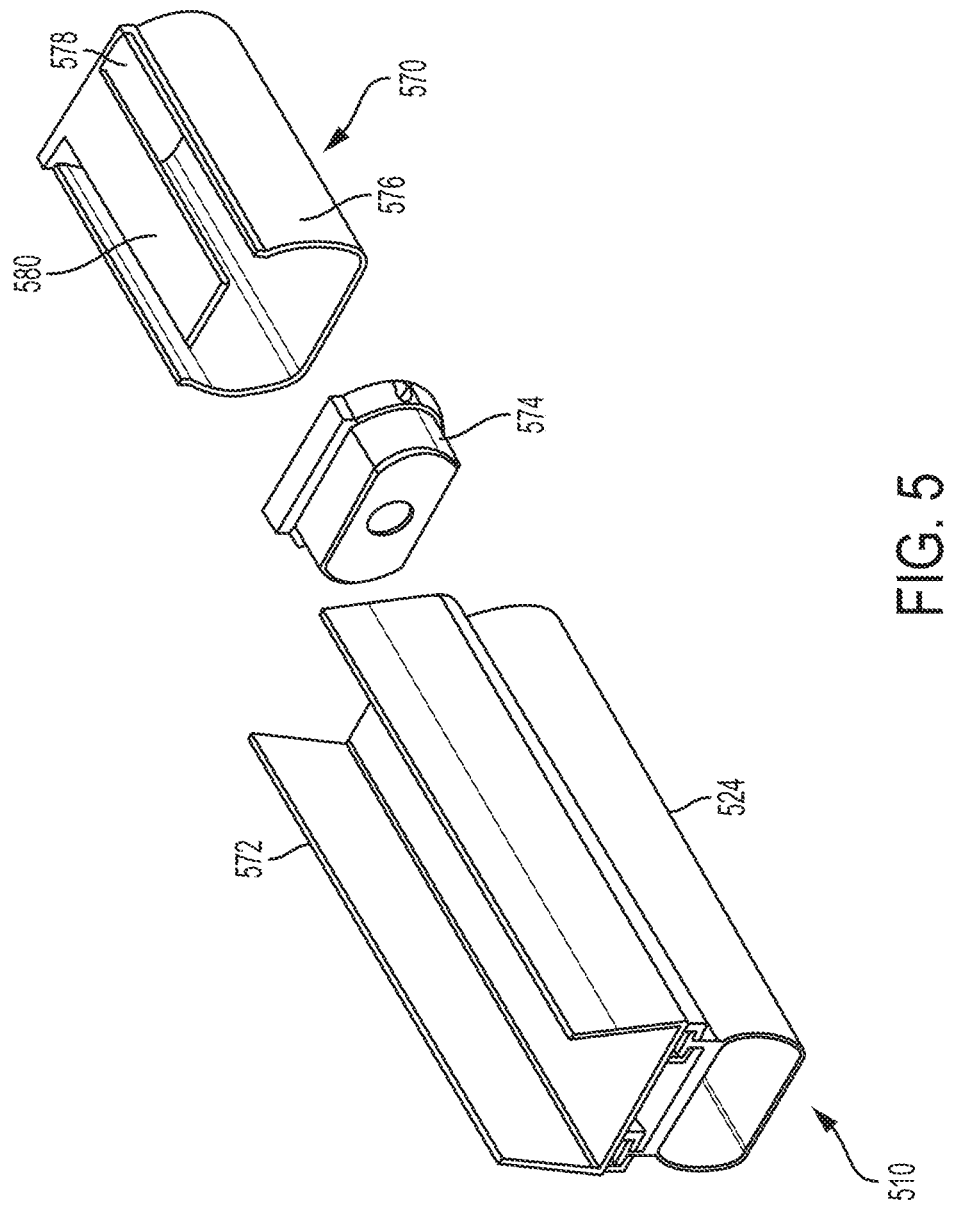
FIG. 5 is a partial exploded front side perspective view of a sensing edge in accordance with a second preferred embodiment of the present invention.

In some installations of the sensing edge 10, such as on a sectional door 14, it may be necessary to prevent the unnecessary detection of nearby stationary objects as obstacles. For example, there may be metal shelving or a file cabinet located proximate to, but clear of, the sensing edge 10 which may otherwise be detected as interfering with door operation. To compensate for the unwanted signal changes, a shield (described in more detail below with respect to the FIGS. 5-7) can be applied over the first and second conductive elements 32, 38 in the sensing edge 10 to prevent detection of these objects by the oscillator 58. The shield may be made from any conductive material, and the effective resistance thereof need not be low. Some examples include a conductive foil (FIG. 7), a conductive polymer (e.g., polyvinyl chloride (PVC), metalized mylar, or the like) (FIG. 6), and the like. Further, the shield may be installed outside of the sheath 24 (FIG. 5). In all cases, the shields are electrically connected to ground (preferably the same ground as used by the oscillator 58).

FIG. 5 shows an embodiment of a shield 570 that can be used with a sensing edge 510 that can alleviate the effects of nearby objects that might otherwise cause a false reading. In FIG. 5, the sheath 524 is shown coupled to a mounting channel 572, which is preferably a flexible bracket that facilitates attachment of the sheath 524 to a leading edge of the door (not shown). At one end (and preferably both ends) of the sheath 524, an end plug 574 is preferably provided to close the sheath 524 and secure the interior components (e.g., the compressible material and the like, not shown in FIG. 5). The shield 570 is preferably an annular shaped tube 576 with one end closed by an end face 578. The shield 570 is preferably placed over the end plug 574, and may surround a portion of the exterior surface 526 of the sheath 524. In FIG. 5, the tube 576 includes a tab 580 that can extend between the sheath 524 and the mounting channel 572.

The shield 570 is made from a conductive material, preferably a conductive polymer-type material, such as conductive PVC or the like, and is connected to ground. The connection to ground can be made by a wire, conductive fitting, conductive traces, or the like. The ground connection can be made on the circuit board 48 (FIG. 3), although the connection may be made in any conventional manner.

Figure 6:
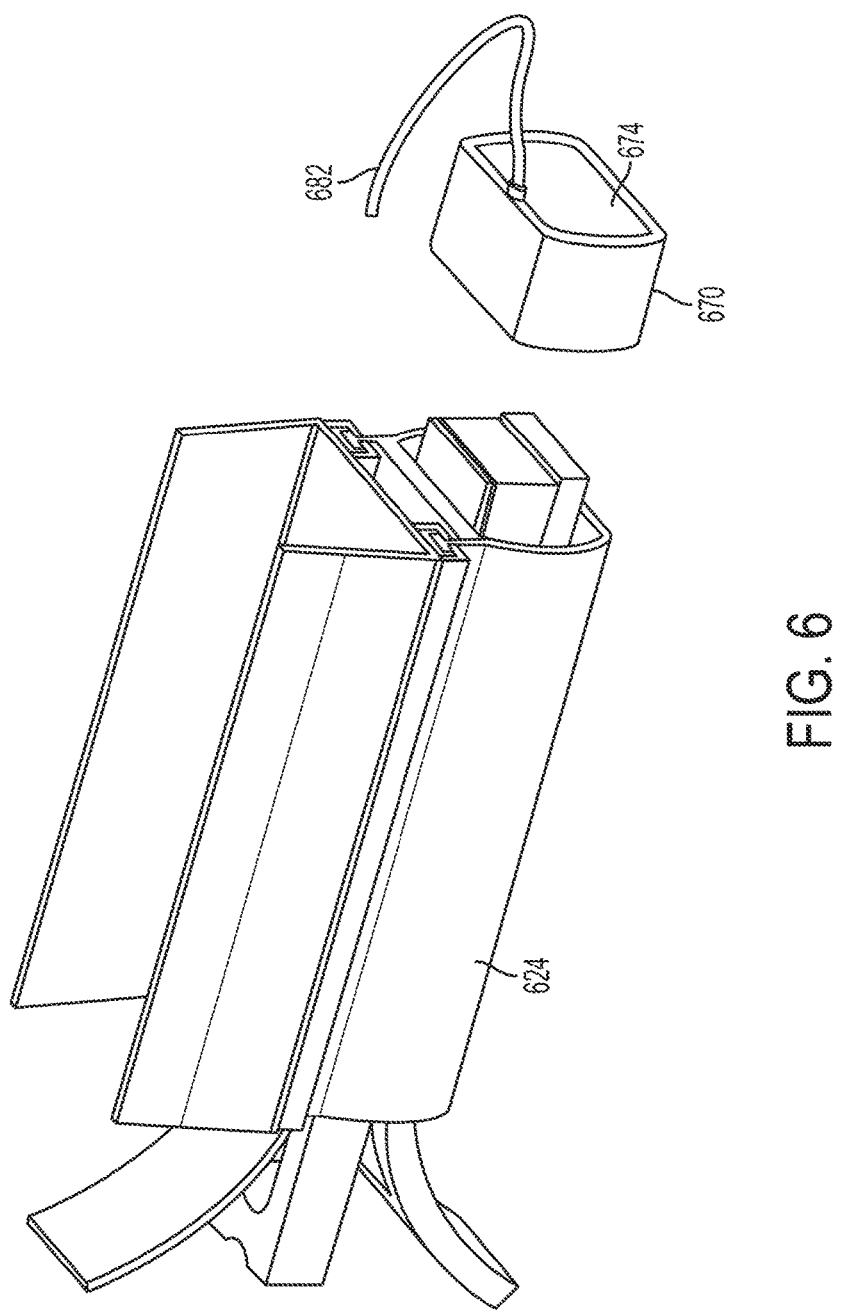
FIG. 6 is a partial exploded front side perspective view of a sensing edge in accordance with a third preferred embodiment of the present invention.

FIG. 6 shows a different embodiment of a shield 670. The shield 670 in FIG. 6, also made of a conductive material, preferably conductive PVC, surrounds a preferably solid end plug 674 made from an insulating material. The combination of shield 670 and end plug 674 can be inserted into the end opening of the sheath 624. FIG. 6 also shows a grounding wire 682 connected to the shield 670, the other end of which (not shown) connects to a ground source, such as on the circuit board 48 (FIG. 3) or other conventional locations.

Figure 7:
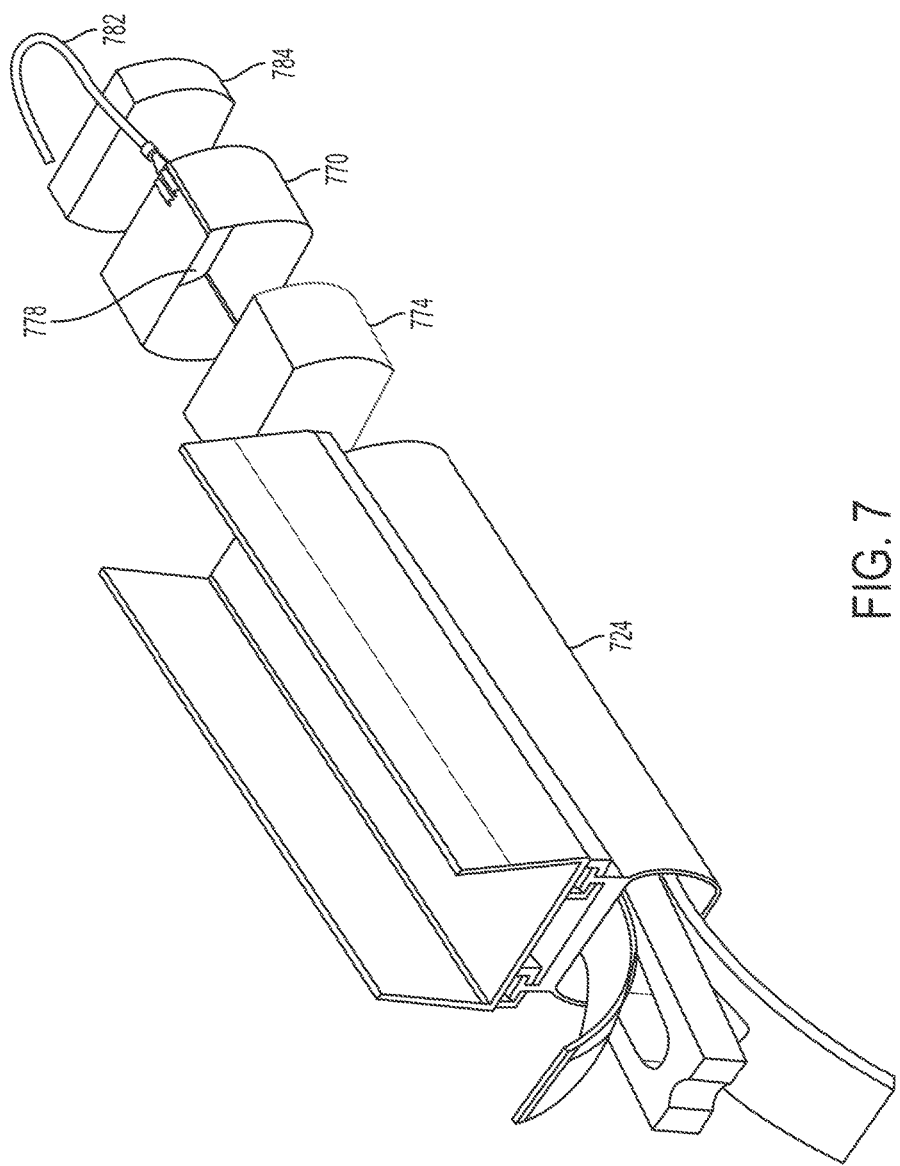
FIG. 7 is a partial exploded front side perspective view of a sensing edge in accordance with a fourth preferred embodiment of the present invention.

FIG. 7 shows yet another embodiment of a shield 770. As in FIG. 6, a solid end plug 774 made from an insulating material is to be inserted into the open end of the sheath 724. The shield 770 takes the form of an aluminum foil or sheet that is shaped to wrap around at least a portion of the end plug 774, and has a grounding wire 782 attached thereto. Preferably, the shield 770 includes an end face 778. While the shield 770 is described as being made from aluminum, other metals or conductive materials may be used as well. An outer end plug 784, also preferably made from insulating material, is preferably inserted into the sheath 724 to enclose the shield 770 within the sheath 724. If necessary, the outer end plug 784 may include a groove (not shown) to accommodate the grounding wire 782.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as described above.

We claim:

1. A system for detecting presence of an external obstacle in the path of an edge of a motorized closure, the system comprising:
    a sensing edge including:
        an elongate sheath configured to be positioned adjacent to the edge of the motorized closure and being compressible upon application of external pressure by the external obstacle, the elongate sheath forming a cavity, and
        first and second electrically conductive elements positioned within the cavity of the sheath, the first and second conductive elements being physically and electrically separated from one another and configured to be forced into contact with one another upon pressure being applied to the sheath by the external obstacle; and
    a control circuit including:
        a self-resonating oscillator electrically connected to each of the first and second conductive elements and configured to drive each of the first and second conductive elements at a drive frequency to establish an electric field proximate to the sensing edge,
        a controller electrically connected to the first and second conductive elements and receiving an output of the oscillator, the controller being configured to determine whether (i) the first and second conductive elements are in electrical contact with one another or (ii) a change to the drive frequency of the oscillator exceeds a threshold value, the controller being further configured to, in response to a finding of either condition (i) or (ii), output a signal to a motor controller of the motorized closure to initiate or disrupt motion of the motorized closure,
        a first inductor electrically connected in series between the controller and a point of connection of the first conductive element to the oscillator, and
        a second inductor electrically connected in series between the controller and a point of connection of the second conductive element to the oscillator.

2. The system of claim 1, wherein the sensing edge further includes a shield mounted to an end of the sheath, the shield being made, at least in part, from a conductive material and being electrically connected to ground.

3. The system of claim 2, wherein the shield is made from a conductive polymer.

4. The system of claim 3, wherein the shield is installed around at least a portion of the sheath.

5. The system of claim 3, wherein the shield is installed within the cavity.

6. The system of claim 2, wherein the shield is made, at least in part, from metal.

7. The system of claim 6, wherein the shield is installed around at least a portion of the sheath.

8. The system of claim 6, wherein the shield is installed within the cavity.

9. The system of claim 1, wherein a reference frequency to which the drive frequency is compared is updated using a slow rolling average filter.

10. The system of claim 1, wherein the control circuit further includes one or more relays connected to the motor controller, the controller being configured to actuate at least one of the one or more relays to signal the motor controller to initiate or disrupt motion of the motorized closure upon a finding of either condition (i) or (ii).

11. A control circuit for a sensing edge used to detect the presence of an external obstacle in the path of an edge of a motorized closure, the sensing edge including an elongate sheath positioned adjacent to the edge of the motorized closure and being compressible upon application of external pressure by the external obstacle, and first and second electrically conductive elements positioned within the sheath, the first and second conductive elements being configured to electrically contact one another upon pressure being applied to the sheath by the external obstacle, the control circuit comprising:
    a self-resonating oscillator electrically connectable to each of the first and second conductive elements and configured to drive each of the first and second conductive elements at a drive frequency to establish an electric field proximate to the sensing edge;
    a controller electrically connectable to the first and second conductive elements and receiving an output of the oscillator, the controller being configured to determine whether (i) the first and second conductive elements are in electrical contact with one another or (ii) a change to the drive frequency of the oscillator exceeds a threshold value, the controller being further configured to, in response to a finding of either condition (i) or (ii), output a signal to a motor controller of the motorized closure to initiate or disrupt motion of the motorized closure;
    a first inductor electrically connected in series between the controller and a point of connection of the first conductive element to the oscillator, and
    a second inductor electrically connected in series between the controller and a point of connection of the second conductive element to the oscillator.

12. The control circuit of claim 11, wherein a reference frequency to which the drive frequency is compared is updated using a slow rolling average filter.

13. The control circuit of claim 11, further comprising one or more relays connected to the motor controller of the motorized closure, the controller being configured to actuate at least one of the one or more relays to signal to the motor controller to initiate or disrupt motion of the motorized closure upon a finding of either condition (i) or (ii).

* * * * *